(12) United States Patent
Tatarinov

(10) Patent No.: US 9,043,915 B2
(45) Date of Patent: May 26, 2015

(54) SYSTEM AND METHOD FOR DETECTING MALICIOUS EXECUTABLE FILES BASED ON SIMILARITY OF THEIR RESOURCES

(71) Applicant: Kaspersky Lab ZAO, Moscow (RU)

(72) Inventor: Ivan I. Tatarinov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 52 days.

(21) Appl. No.: 14/072,391

(22) Filed: Nov. 5, 2013

(65) Prior Publication Data

US 2014/0366137 A1 Dec. 11, 2014

(30) Foreign Application Priority Data

Jun. 6, 2013 (RU) .................................. 2013125979

(51) Int. Cl.
*G06F 12/14* (2006.01)
*G06F 21/56* (2013.01)

(52) U.S. Cl.
CPC .............. *G06F 21/56* (2013.01); *G06F 21/562* (2013.01); *G06F 21/566* (2013.01)

(58) Field of Classification Search
None
See application file for complete search history.

(56) References Cited

U.S. PATENT DOCUMENTS

| 7,809,667 | B1 | 10/2010 | Yehuda et al. |
| 8,037,535 | B2 | 10/2011 | Maloof |
| 8,214,905 | B1 * | 7/2012 | Doukhvalov et al. ........... 726/24 |
| 8,256,000 | B1 | 8/2012 | Krishnappa |
| 8,312,546 | B2 | 11/2012 | Alme |
| 8,424,091 | B1 * | 4/2013 | Su et al. ........................ 726/24 |
| 2003/0023865 | A1 | 1/2003 | Cowie et al. |
| 2006/0167860 | A1 | 7/2006 | Elaiashberg et al. |
| 2007/0240217 | A1 * | 10/2007 | Tuvell et al. .................... 726/24 |
| 2011/0083187 | A1 | 4/2011 | Malanov |
| 2011/0239294 | A1 * | 9/2011 | Kim et al. ...................... 726/22 |
| 2012/0159625 | A1 * | 6/2012 | Jeong et al. .................... 726/23 |
| 2012/0240231 | A1 * | 9/2012 | Sohn et al. ..................... 726/24 |
| 2013/0097704 | A1 | 4/2013 | Gavrilut et al. |

FOREIGN PATENT DOCUMENTS

RU 2468418 C2 11/2012

* cited by examiner

*Primary Examiner* — Kaveh Abrishamkar

(74) *Attorney, Agent, or Firm* — Arent Fox LLP; Michael Fainberg

(57) ABSTRACT

Disclosed are systems, methods and computer program products for detection of malicious executable files based on the similarity of various types of extractable resources of the executable files. In one aspect, the system determines a type of an executable file being analyzed and determines types of extractable resources of the executable file based on the type of the executable file. The system then extracts the identified extractable resources of the executable file and compares the extracted resources to known resources of malicious executable files. The system then determines a degree of similarity between the compared resources. The system then determines whether the executable file is malicious based on a degree of similarity of the one or more compared resources.

20 Claims, 7 Drawing Sheets

```
IDD_DIALOG__UPDATE_DB DIALOGEX 0, 0, 340, 93                                    430
STYLE DS_SETFONT | DS_MODALFRAME | DS_FIXEDSYS | WS_POPUP | WS_CAPTION |
WS_SYSMENU
CAPTION "Setting of local database"
FONT 8, "MS Shell Dlg", 400, 0, 0x1
BEGIN
    GROUPBOX      "Update Local Database",IDC_STATIC,7,7,326,52
    CONTROL       "",IDC_DATETIMEPICKER__PREVIOUS_UPDATE_DATE,
            "SysDateTimePick32",DTS_RIGHTALIGN | WS_TABSTOP,35,21,135,15
    PUSHBUTTON    "Cancel",IDCANCEL,87,65,75,21
    CONTROL       "",IDC_DATETIMEPICKER__NEXT_UPDATE_DATE,
            "SysDateTimePick32",DTS_RIGHTALIGN | WS_TABSTOP,189,21,135,15
    LTEXT         "c",IDC_STATIC,27,24,8,8
    LTEXT         "no",IDC_STATIC,176,24,9,8
    CONTROL       "Clean local DB",IDC_CHECK__CLEAN_DB,"Button",BS_AUTOCHECKBOX |
WS_TABSTOP,27,43,100,10
    DEFPUSHBUTTON "Update",IDOK,7,65,75,21
END
```

```
IDD_DIALOG__UPDATE_DB DIALOGEX 0, 0, 340, 93                                    440
STYLE DS_SETFONT | DS_MODALFRAME | DS_FIXEDSYS | WS_POPUP | WS_CAPTION |
WS_SYSMENU
CAPTION "Setting of local database"
FONT 8, "MS Shell Dlg", 400, 0, 0x1
BEGIN
    GROUPBOX      "Update Local Database",IDC_STATIC,7,7,326,52
    CONTROL       "",IDC_DATETIMEPICKER__PREVIOUS_UPDATE_DATE,
            "SysDateTimePick32",DTS_RIGHTALIGN | WS_TABSTOP,35,21,135,15
    CONTROL       "",IDC_DATETIMEPICKER__NEXT_UPDATE_DATE,
            "SysDateTimePick32",DTS_RIGHTALIGN | WS_TABSTOP,189,21,135,15
    CONTROL       "Clean Local DB",IDC_CHECK__CLEAN_DB,"Button",BS_AUTOCHECKBOX |
WS_TABSTOP,27,43,100,10
    LTEXT         "c",IDC_STATIC,27,24,8,8
    LTEXT         "no",IDC_STATIC,176,24,9,8
    DEFPUSHBUTTON "Update",IDOK,7,65,75,21
    PUSHBUTTON    "Cancel",IDCANCEL,87,65,75,21
END
```

```
DIALOGEX 0, 0, 340, 93                                                         450
STYLE DS_SETFONT | DS_MODALFRAME | DS_FIXEDSYS | WS_POPUP | WS_CAPTION |
WS_SYSMENU
CAPTION "Setting of local database"
FONT 8, "MS Shell Dlg", 400, 0, 0x1
BEGIN
    GROUPBOX      "Update Local Database",7,7,326,52
    CONTROL       "","SysDateTimePick32",DTS_RIGHTALIGN | WS_TABSTOP,35,21,135,15
    CONTROL       "","SysDateTimePick32",DTS_RIGHTALIGN | WS_TABSTOP,189,21,135,15
    CONTROL       "Clean Local DB",IDC_CHECK__CLEAN_DB,"Button",BS_AUTOCHECKBOX |
WS_TABSTOP,27,43,100,10
    LTEXT         "c",27,24,8,8
    LTEXT         "no",176,24,9,8
    DEFPUSHBUTTON "Update",7,65,75,21
    PUSHBUTTON    "Cancel",87,65,75,21
END
```

Fig. 4B

SYSTEM AND METHOD FOR DETECTING MALICIOUS EXECUTABLE FILES BASED ON SIMILARITY OF THEIR RESOURCES

CROSS-REFERENCE TO RELATED APPLICATIONS

This application claims benefit of priority under 35 U.S.C. 119(a)-(d) to a Russian Application No. 2013125979 filed on Jun. 6, 2013, which is incorporated by reference herein.

TECHNICAL FIELD

The disclosure relates generally to the field of information security, and more specifically to systems and methods for detection of malicious executable files based on the similarity of various types of extractable resources of the executable files.

BACKGROUND

Malicious software, commonly known as malware, is often used to steal personal and financial information. To accomplish such goals, the creators of malicious programs use various technical methods and social engineering methods. For example, a malicious program of false antivirus type, in the form of an antivirus program, may detect nonexistent threats and demands payment of money to remove them. Externally, the malicious program resembles the legal antivirus program and uses similar icons, scripts, cursors and sound effects.

Blockers are a type of malicious program that limit access to files and the operating system of the user computer and demand ransom for restoring operation, for example, under threat of destroying data. A malicious program of this type may display a text or a picture indicating that a violation of rights has occurred and demanding payment of compensation. The texts or pictures used in different blocker modifications differ little from each other.

The number of techniques used by malicious programs to conceal and/or modify its code is constantly growing. Techniques such as polymorphism and metamorphism enable malicious programs to avoid detection using common malware detection methods, such as signature analysis, hash sum analysis, heuristic analysis, and other. Situations may occur where, for example, a user sees the very same interface of a previously known malicious program, but the user's antivirus software does not consider the program malicious.

Therefore, there is a need for improved techniques for detection of malware.

SUMMARY

Disclosed are systems, methods and computer program products for detection of malicious executable files based on the similarity of various types of extractable resources of the executable files. In one example aspect, the system may be operable to determine a type of an executable file being analyzed. The system may further determine types of extractable resources of the executable file based on the type of the executable file. The system may then extract the identified extractable resources of the executable file and compare the extracted resources to a plurality of known resources of malicious executable files. The system may then determine a degree of similarity between one or more compared resource of the executable file and the plurality of known resources of malicious executable files. The system may then determine whether the executable file is malicious based on a degree of similarity of the one or more compared resources, wherein different thresholds of the degrees of similarity are used in determining the maliciousness of different types of resources.

In one example aspect, the system may add up respective degrees of similarity for the plurality of compared resource in order to determine a degree of similarity between one or more compared resource and the plurality of known resources of malicious executable files.

In another example aspect, the system may use a plurality of different comparison algorithms in comparison of different types of extracted resources.

In one example aspect, the system may consider an executable file to be malicious when the degree of similarity of at least one of the compared resources of the executable file to the known resources of a malicious executable file exceeds a given threshold, and consider the file not malicious when the degree of similarity of at least one of the compared resources to the known resources of a malicious executable file does not exceed the given threshold.

In another example aspect, the system further configured to compare the extracted resources of the executable file to a plurality of known resources of clean executable files, determine a degree of similarity between the one or more resource of the executable file and the plurality of known resources of clean executable files, and determine whether the executable file is malicious based on the determined degrees of similarity with known resources of clean executable files and the determined degrees of similarity with known resources of malicious executable files.

In another example aspect, when the file was determined to be malicious, the system may perform an antivirus check on the executable file. In various aspects, the antivirus check may include one of signature analysis, heuristic analysis and behavioural analysis.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

FIGS. 4A and 4B illustrate the technique of comparison of the elements of dialogue windows according to one aspect of the invention.

DETAILED DESCRIPTION

Example aspects of the present invention are described herein in the context of systems, methods and computer program products for detection of malicious files based on the similarity of their resources. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Malicious programs are typically launched from malicious executable files. There are many types of executable files. Table 1 shows examples of known types of executable files.

TABLE 1

| | |
|---|---|
| .acr | ACRobot scenario |
| .actm | AutoCAD macro |
| .ahk | AutoHotkey scenario |
| .air | Adobe AIR setup package |
| .apk | Android program package |
| .app | Mac OS X program |
| .app | FoxPro program |
| .app | Symbian OS program |
| .asb | Visual Basic macro (Alphacam) |
| .awk | AWK scenario |
| .bat | MS-DOS package file |
| .bin | Unix executable file |
| .cgi | Web-page, CGI scenario |
| .cmd | Windows package file |
| .cof | MPLAB COFF executable file |
| .com | MS-DOS program |
| .csh | C Shell scenario |
| .cyw | Rbot.CYW Worm file |
| .dek | Eavesdropper package file |
| .dld | EdLog decompiled program |
| .dmc | Medical Manager scenario |
| .ds | TWAIN data source |
| .dxl | Rational DOORS scenario |
| .ebm | EXTRA! basic macro |
| .ecf | SageCRM component file |
| .elf | Playstation executable file |
| .es | SageCRM scenario file |
| .esh | DOS expanded package file |
| .elf | Nintendo Wii executable game file |

Figure 1:
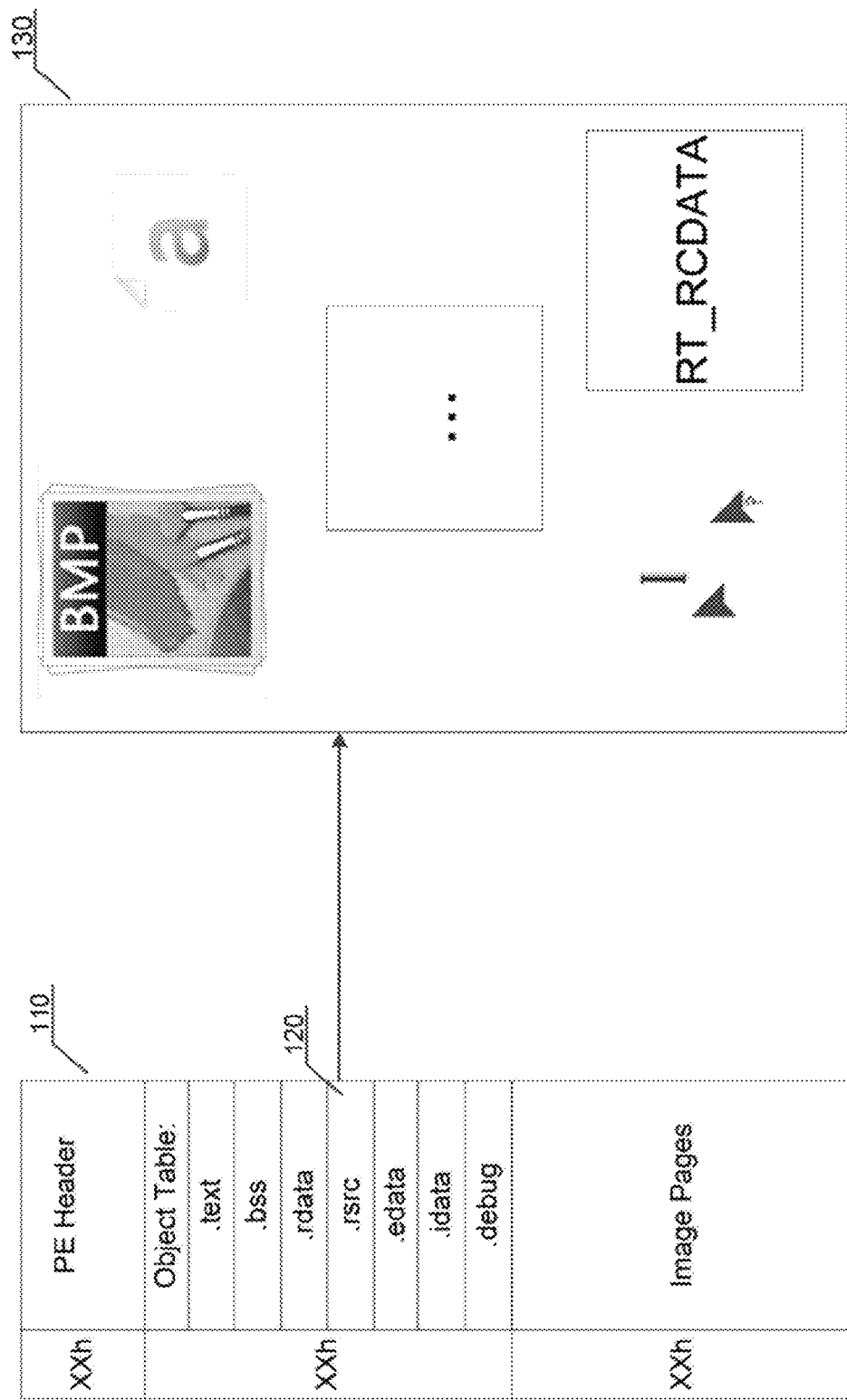
FIG. 1 is a diagram illustrating an example structure of an executable file.

FIG. 1 shows an example of the structure of an executable file. An executable file 110 consists of several parts. The part containing sections is usually called the "Object table". The section in an executable file is either code or certain data (e.g., global variables, import and export tables, resources, correspondence table, etc.). Each section has a set of attributes, specifying its properties. The attributes of a section determine whether the section is accessible for reading and writing, whether it contains executable code, should it be left in memory after the executable file is loaded, can different processes utilize a single copy of this section, and other attributes. One of the sections, typically called ".rsrc" 120, stores resources 130, such as icons, text instructions, dialogue windows, scripts and other resources. These resources are necessary for the proper operation of the executable file 110. In addition, a resource type RT_RCDATA may contain arbitrary data used by the executable file 110.

Figure 2:
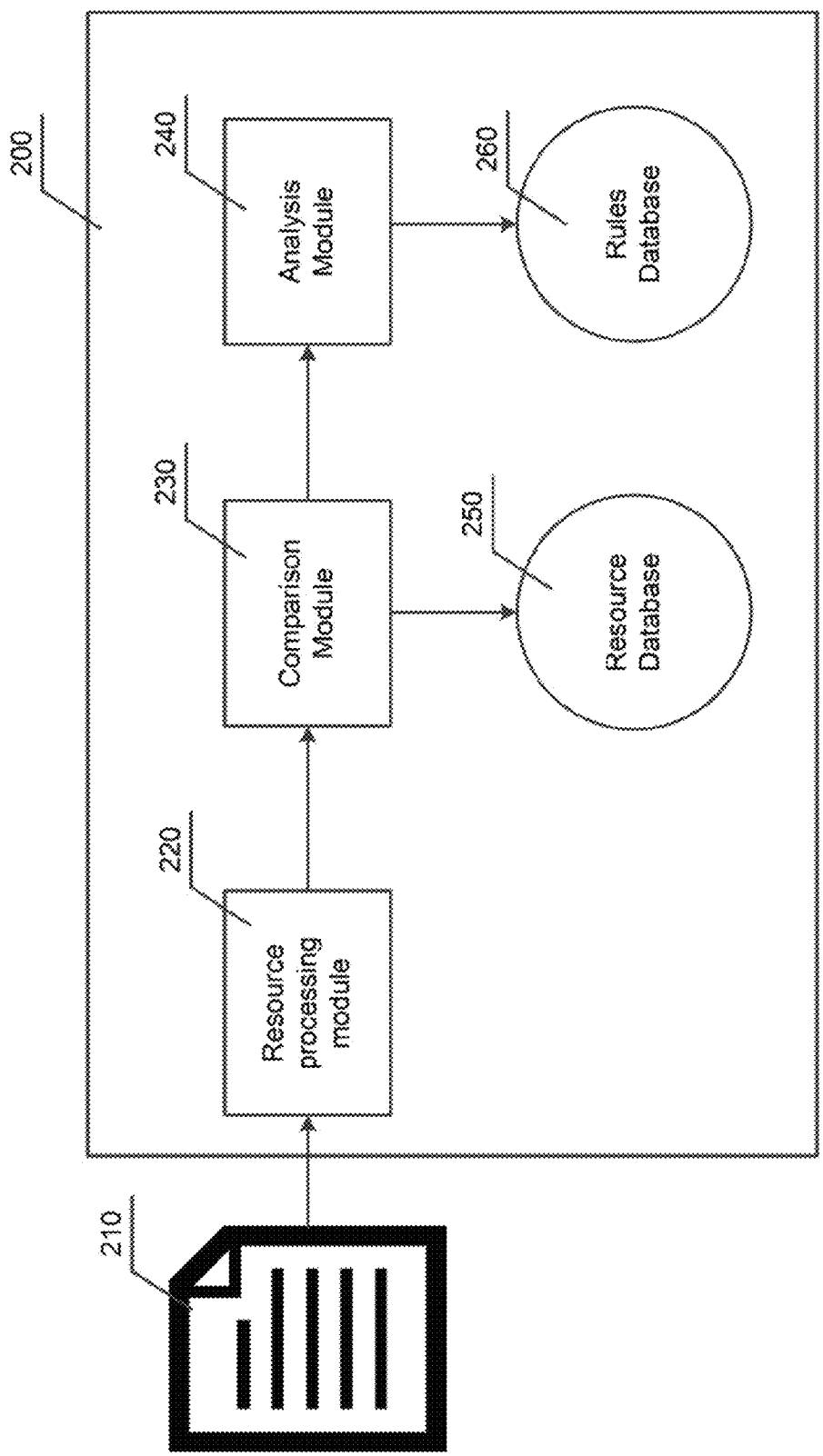
FIG. 2 is a diagram illustrating an example configuration of the system for detection of malicious executable files based on the similarity of their resources according to one aspect of the invention.

FIG. 2 is a structural diagram of the system for detection of malicious executable files based on the similarity of resources of the executable files in accordance to one aspect of the invention. In one aspect, the system 200 may include a resource processing module 220, a comparison module 230, the verification module 240, a resource database 250 and a rules database 260. The resource processing module 220 is operable to determine the type of the executable file 210 being analyzed, to determine the types of extractable resources from the type of the executable file 210 being analyzed, to extract the resources of the executable file 210 being analyzed, and to transmit the resources to the comparison module 230. The comparison module 230 is operable to search for similarity of the resources of the extractable file 210 being analyzed to known resources of malicious executable files by adding up degrees of similarity when comparing the resource of the executable file 210 being analyzed to known resources of malicious executable files that are stored in the resource database 250, by comparison algorithms for corresponding types of resources, determining and transmitting the results of the search for similarity of resources of the executable file 210 being analyzed to known resources of malicious executable files to the verification module 240. The comparison may be done for all types of resources in turn. The result of the search for similarity of resources of the executable file 210 being analyzed to known resources of malicious executable files contains the degrees of similarity of all resources of the executable file 210 being analyzed. The verification module 240 is operable to determine whether the executable file 210 is malicious based on the result of the search for similarity of resources using rules from the rules database 260, and also based on the antivirus check of analyzed executable files that were determined to be malicious. The antivirus check may include, but not limited to the signature analysis, heuristic analysis, hash sum analysis, behavioural analysis and other. The resource database 250 is operable to save the known resources of malicious executable files. The rules database 260 is operable to save the rules for determining whether the analyzed executable file is malicious based on of the result of the search for similarity of resources of the executable file being analyzed to known resources of malicious executable files.

Various kinds of databases can be used as the resource database 250 and the rules database 260, for example: hierarchical (IMS, TDMS, System 2000), network (Cerebrum, Cronospro, DBVist), relational (DB2, Informix, Microsoft SQL Server), object-oriented (Jasmine, Versant, POET), object-relational (Oracle Database, PostgreSQL, FirstSQL/J, functional, and so on. An example of a structure of a possible resource database is given in Table 2 below.

TABLE 2

| ID | Resource | Hash | Histogram | Bit count | Parameter N | Name of executable file |
|---|---|---|---|---|---|---|
| 1 | 1.bmp | Value of parameter 1 | Value of parameter 2 | Value of parameter 3 | Value of parameter N | example1.exe |

In one aspect, in addition to the known resources of malicious executable files, the resource database 250 may store known resources of executable files not containing malicious code (i.e., clean files). If the executable file being analyzed contains both known resources of malicious executable files and known resources of clean executable files, a wrong verdict may be given, which may result in a false positive detection. In such cases, a file may undergo a more detailed antivirus check using conventional detection methods, such as signature analysis, heuristic analysis, hash sum analysis, behavioural analysis, or other methods.

In one aspect, the rules in the rules database 260 may be specified initially by an antivirus program and modified after updating of antivirus databases. In one aspect, these rules may specify different thresholds of degrees of similarity for different types of resources. When the degree of similarity of two resources exceeds a threshold, the corresponding rule will indicate that the executable file is malicious. In one aspect, a rule may specify different thresholds for the degree of similarity of a specific type of resources of an executable file and for a group of resources of the executable file. For example, a similarity for one specific type of resource, such as an icon, may be more significant than for other types of resources. In another example, even a hundred percent degree of similarity for one type of resource may have no special significance. Examples rules of database 260 are shown in Table 3 below.

TABLE 3

| ID | Statement of the rule | Verdict |
| --- | --- | --- |
| 1. | Degree of similarity of any given resource to a resource from the resource database >80%. | Malicious program |
| 2. | Degree of similarity of an icon to a resource from the resource database >50%; that of a resource containing an audio recording >70%. | Malicious program |
| 3. | Degree of similarity of all resources of the executable file to resources from the resource database >50%. | Malicious program |

In one example aspect, icons can be one type of resource that can be used for comparison by the comparison module 230. Icons and cursors are graphic types of resources of an executable file which, after being extracted from the executable file, may be converted into a file of format .bmp. Scripts may be converted into files .ttf. RT_RCDATA may store files and resources of any given types and formats, such as: .jpg, .wav, .txt. In one aspect, different types of resources may have different comparison algorithms. For example, hash sums comparison may be used an all types of resources. In one example aspect, when it is possibility to convert an extracted resource into a file of a particular format, all comparison algorithms for that file format may be used for comparing the extracted resource with resources of known malicious files.

Figure 3:
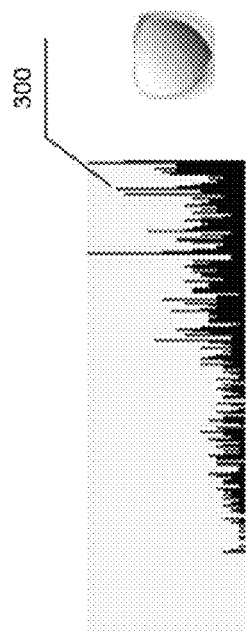
FIG. 3 illustrates the result of the operation of the algorithm for comparison of graphic resources by analysis of Y-histograms according to one aspect of the invention.
Figure 3:
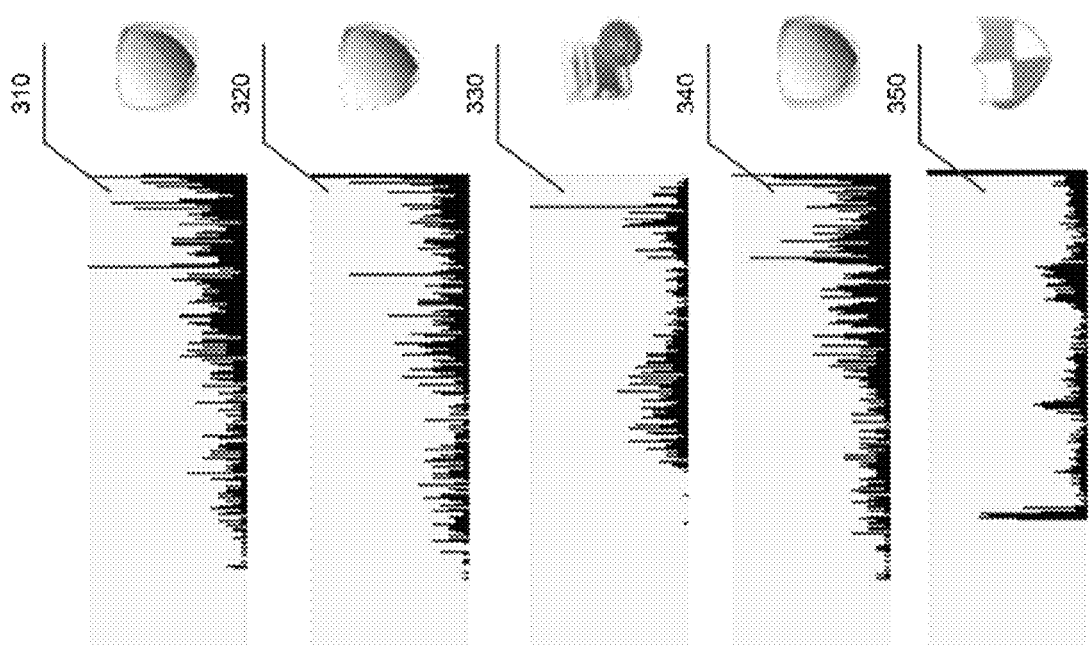

For example, a popular algorithm for comparison of graphic files .bmp is the analysis of file's Y-histograms. FIG. 3 shows the result of the operation of a comparison algorithm for graphic files via analysis of its Y-histograms. The file 300 is an icon of size 32×32 pixels and bit count of 32 bits, having hash MD5: 87241a4f92f1efee41938d925f3ba303. A comparison is made of the Y-histogram of the file 300 with the Y-histograms of other known files by the following criteria: size 32×32 pixels, bit count 32. As a result of the comparison, 5 (out of 1000) entries are found: 310, 320, 330, 340, 350, which meet the search criteria. Analysis of Y-histograms gives a result of more than 95% similarity for the files 310, 320, 340 having the following MD5 hashes: b14a1e29d8a630c365a05349e8fccd9a, bc221dea2e39fd102261b2e65aaba41c, e3c763646e2a60658a21d72f8a1fb9e7. Thus, the files 300, 310, 320, 340 are visually similar, but have different hash sums MD5.

In another example, the comparison module 230 may use a different algorithm for comparison of text files. For example, a text alignment algorithm described in "A Tool for Text Comparison," by Piao et al., which is incorporated by reference herein, may be used for comparison of text files. Other text comparison algorithms may be used in different embodiments.

Yet in another example, the comparison module 230 may use a different algorithm for comparison of audio files. For example, a dynamic time warping algorithm described in "Evaluation of Similarity Searching Methods for Music Data in Peer-to-Peer Networks," by Karydis et al., which is incorporated by reference herein, may be used for comparison of audio files. Other audio comparison algorithms may be used in different embodiments.

Yet in another aspect, the comparison module 230 may use dialogue windows as another type of resource used for comparison. A dialogue window is a window of the graphic user interface operable for output of information and/or to receive a response from the user. Thus, a dialogue window implements a two-way interaction between the computer and the user (a "dialogue"). The structure of dialogue windows is reminiscent of the structure of program windows and obeys shared rules. In the upper part of the window is placed the header line, beneath which the entire space is occupied by the working area. The entire window is enclosed in a frame. Changing the dimensions of dialogue windows is not permitted. The working area in dialogue windows contains control elements. Settings are done in dialogue windows by interacting with the control elements. The control elements serve for inputting data (text or numbers), selecting one or several variants from a number of specified ones, performing auxiliary operations, responding to user-specified questions, and so on.

Figure 4A:
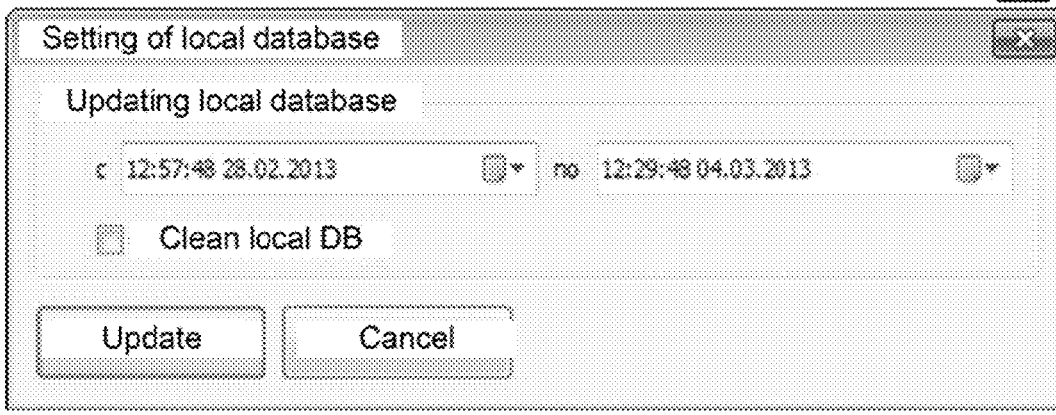

The dialogue windows may be create either directly, by creating the window and the elements (e.g., via Windows API), or with the use of templates. A template constitutes data about the parameters and elements used in the displaying of the dialogue window. In the source code, a template has the type of text information; in the program after compilation, the form of compressed information. FIGS. 4A and 4B illustrate a technique for comparison of elements of dialogue windows which can be performed by the comparison module 230. For example, the template of a dialogue window 410 during execution is shown in FIG. 405.

Several algorithms exist for comparing the similarity of two dialogue windows using templates. First algorithm is "element-by-element" comparison: in this case, the templates are compared element by element. When the elements of the template being examined are identical to the elements of the template being compared, the dialogue windows are similar.

Second algorithm for comparison of dialog windows is a "comparison by presence of elements". This comparison is based on the fact that the transpositioning of elements does not affect the function of dialogue windows. For example, the templates of the dialogue windows 420 and 430 are identical. The comparison algorithm in this case is as follows: (1) Putting the templates into universal form. Elements follow each other not in the order in which they were arranged by the programmer, but according to a certain rule (for example, by increasing identifier (ID) of the element); the attributes within the elements are indicated not in disorganized manner, but according to a certain rule (for example, by increasing identifier (ID) of the attribute). (2) Comparing the resulting universal templates element by element. After performing the second algorithm, the template 430 is converted into template 440.

It should be noted that these two algorithms compare totally identical dialogue windows with no differences at all when displayed, but the second algorithm, is more universal, even though slower than the first, since it requires an analysis of the template of a window.

The thirds comparison algorithm described below is similar to the second algorithm, with one difference that certain parameters are ignored when creating a universal template. The main reason for ignoring them is that the second comparison algorithm may be ineffective even for a minimal change in the template of the dialogue window (shifting of an element, changing of text, and so on). The third comparison algorithm is identical to the second algorithm, except for the rules used to construct the universal template:

The third comparison algorithm is a "comparison with altered elements":

3.1 Ignoring the ID of elements

For example, consider the following element:

IDD_DIALOG_UPDATE_DB DIALOGEX 0, 0, 340, 93

IDD_DIALOG_UPDATE_DB is the identifier of the dialogue window, which may differ from one program to the next. This element does not affect the function of the dialogue window 450 and it can be eliminated from the comparison.

3.2 Ignoring of elements by default.

For example,

DEFPUSHBUTTON "Refresh",7,65,75,21 becomes

PUSHBUTTON "Refresh",7,65,75,21

3.3 Ignoring certain unimportant parameters of elements which do not affect the external type of the dialogue window.

For example, the flag WS_TABSTOP shows that this element can be activated by pressing the Tab key. This flag does not affect the external view of the dialogue window.

3.4 Ignoring the size and position of elements while preserving their relations.

In one aspect, it is also possible to exclude the dimensions and coordinates of the elements from the template. But in order for the template not to become a set of elements after performing the third algorithm, it is desirable to leave the relations between the elements alone. For example, all the elements belonging to the region "GROUPBOX" should have coordinates falling into this region. The position and size of the region "GROUPBOX" are specified by a set of values of the parameters {xgroupbox, ygroupbox, xgroupbox+wgroupbox, ygroupbox+hgroupbox}. Thus, these elements are related elements.

Figure 5:
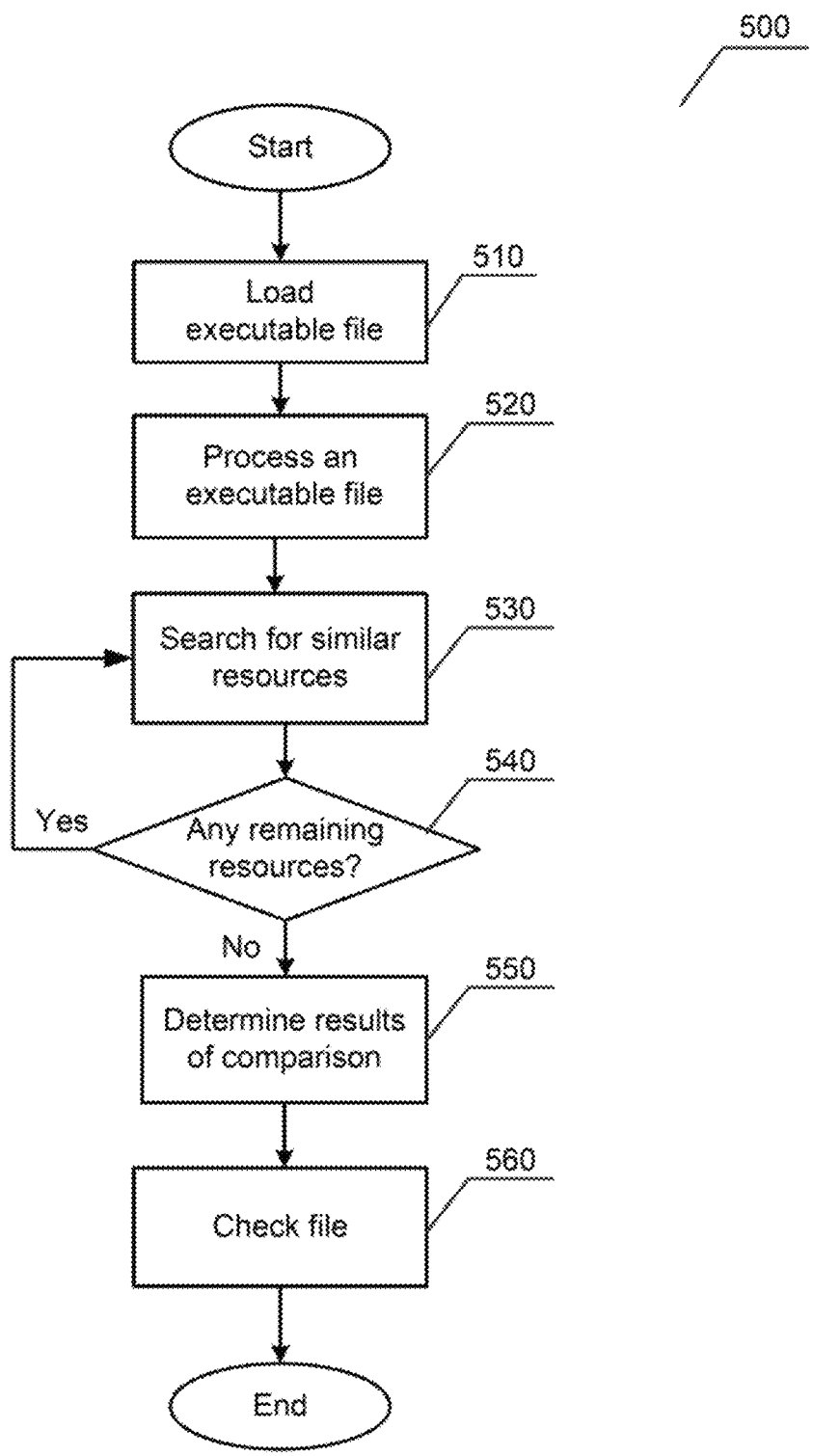
FIG. 5 is a flow diagram illustrating an example method of detection of malicious executable files based on the similarity of their resources according to one aspect of the invention.

FIG. 5 shows the method of detection of malicious executable files based on the similarity of resources of the executable files. At step 510, an antivirus program loads an executable file and initiates the process of checking, during which the executable file 210, containing resources, is sent to the system for detection of malicious executable files based on the degree of similarity of the resources. At step 520, the resource processing module 220 performs a processing on the executable file 210 being analyzed, consisting in determining the type of the executable file 210, determining the types of extractable resources from the type of the executable file 210, extracting the resources of the executable file 210 and sending them to the comparison module 230. At step 530, the comparison module 230 performs a search for similarity of the resource of the executable file 210 to known resources of malicious executable files by adding up the degree of similarity when comparing the resource of the executable file 210, obtained from the resource processing module 220, to known resources of malicious executable files that are kept in the resource database 250 by comparison algorithms for corresponding types of resources. At step 540, the comparison module 230 checks for the presence of the next resource for the search. If the search has not been performed for all resources, the comparison module 230 receives the next resource. If the search has been done for all resources, at step 550, the comparison module 230 determines the result of the search for similarity of resources of the executable file 210 being analyzed to known resources of malicious executable files and relays this to the verification module 240. At step 560, the verification module 240 on the basis of the result of the search for similarity of resources of the executable file 210 to known resources of malicious executable files determines, by the rules from the rules database 260, whether the file is malicious. If the executable file being analyzed has been determined to be malicious, the verification module 240 additionally performs an antivirus check, using signature analysis, heuristic analysis, hash sum analysis or other.

Figure 6:
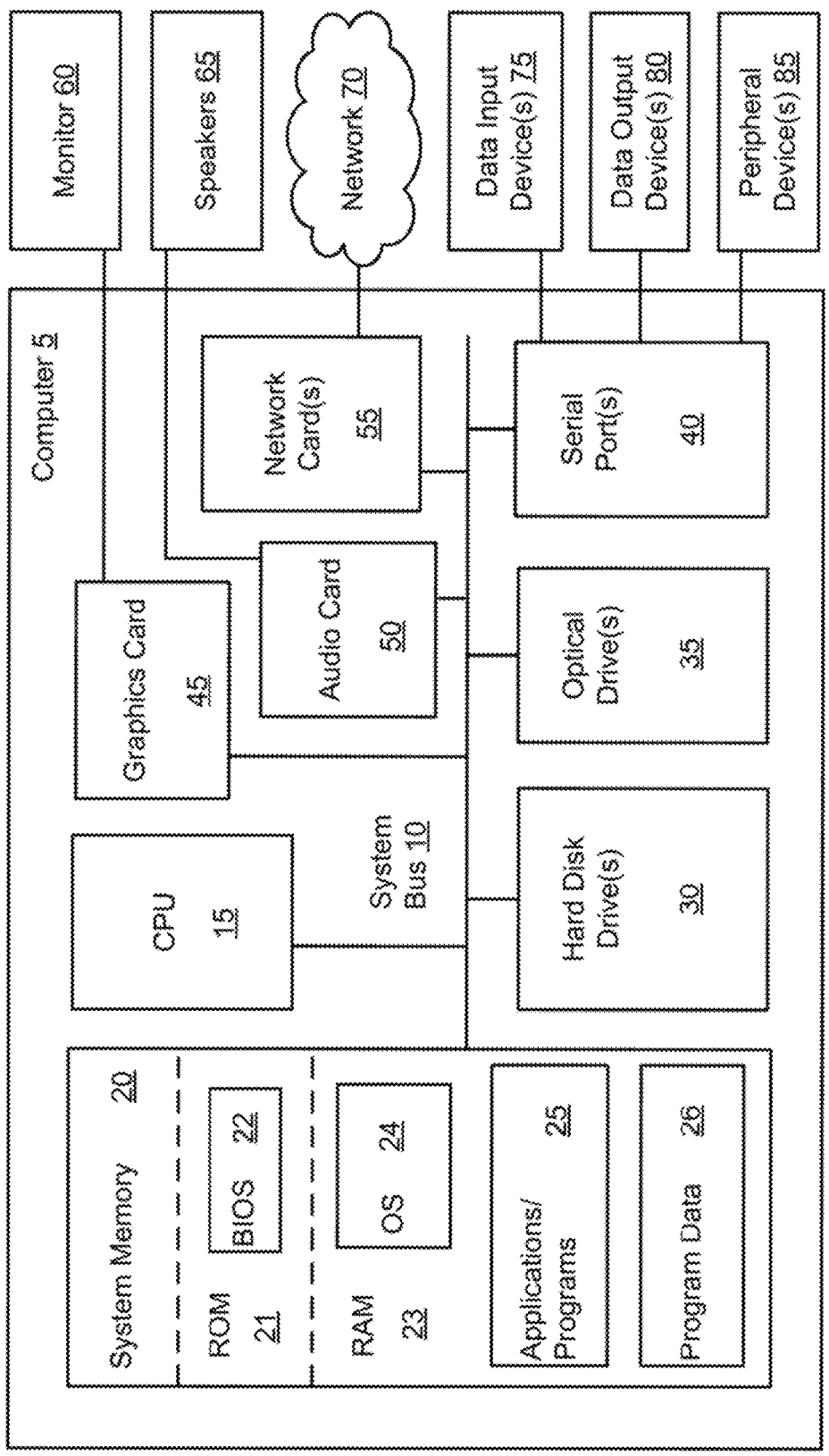
FIG. 6 is a diagram illustrating an example general-purpose computer system on which the systems and methods for detection of malicious executable files can be deployed in accordance with aspects of the invention.

FIG. 6 depicts one example aspect of a computer system 5 that can be used to implement the disclosed systems and methods for detection of malicious executable files based on the similarity of resources of the executable files. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of malicious executable files, the method comprising:
   determining a type of an executable file;
   determining types of extractable resources of the executable file based on the type of the executable file;
   extracting the identified extractable resources of the executable file;
   comparing the extracted resources of the executable file to a plurality of known resources of malicious executable files, each resource being defined with a plurality of attributes and each attribute being associated with a parameter;
   determining a degree of similarity between the one or more resource of the executable file and the plurality of known resources of malicious executable files based at least on parameters of the plurality of attributes of resources; and
   determining whether the executable file is malicious based on the determined degree of similarity of the one or more compared resources, wherein different thresholds of the degrees of similarity are used in determining the maliciousness of different types of resources.

2. The method of claim 1, wherein determining a degree of similarity between one or more compared resource of the executable file and the plurality of known resources of malicious executable files further includes adding up respective degrees of similarity for the plurality of compared resource.

3. The method of claim 1, wherein comparing the extracted resources of the executable file to a plurality of known resources of malicious executable files further includes using a plurality of different comparison algorithms for different types of extracted resources.

4. The method of claim 1, wherein the executable file is considered malicious when the degree of similarity of at least one of the compared resources of the executable file to the known resources of a malicious executable file exceeds a given threshold.

5. The method of claim 1, wherein the executable file is considered not malicious when the degree of similarity of at least one of the compared resources of the executable file to the known resources of a malicious executable file does not exceed a given threshold.

6. The method of claim 1, further comprising:
   comparing the extracted resources of the executable file to a plurality of known resources of clean executable files;
   determining a degree of similarity between the one or more resource of the executable file and the plurality of known resources of clean executable files; and
   determining whether the executable file is malicious based on the determined degrees of similarity with known resources of clean executable files and the determined degrees of similarity with known resources of malicious executable files.

7. The method of claim 1, further comprising:
   when the executable file is determined to be malicious, performing an antivirus check on the executable file, wherein the antivirus check includes one of signature analysis, heuristic analysis, hash sum analysis, and behavioural analysis.

8. A system for detection of malicious executable files, the system comprising:
a processor configured to:
determine a type of an executable file;
determine types of extractable resources of the executable file based on the type of the executable file;
extract the identified extractable resources of the executable file;
compare the extracted resources of the executable file to a plurality of known resources of malicious executable files, each resource being defined with a plurality of attributes and each attribute being associated with parameter;
determine a degree of similarity between one or more compared resource of the executable file and the plurality of known resources of malicious executable files based at least on parameters of the plurality of attributes of resources; and
determine whether the executable file is malicious based on a degree of similarity of the one or more compared resources, wherein different thresholds of the degrees of similarity are used in determining the maliciousness of different types of resources.

9. The system of claim 8, wherein to determine a degree of similarity between one or more compared resource of the executable file and the plurality of known resources of malicious executable files, the processor is further configured to add up respective degrees of similarity for the plurality of compared resource.

10. The system of claim 8, wherein to compare the extracted resources of the executable file to a plurality of known resources of malicious executable file the processor is further configured to use a plurality of different comparison algorithms for different types of extracted resources.

11. The system of claim 8, wherein the executable file is considered malicious when the degree of similarity of at least one of the compared resources of the executable file to the known resources of a malicious executable file exceeds a given threshold.

12. The system of claim 8, wherein the executable file is considered not malicious when the degree of similarity of at least one of the compared resources of the executable file to the known resources of a malicious executable file does not exceed a given threshold.

13. The system of claim 8, wherein the processor is further configured to:
compare the extracted resources of the executable file to a plurality of known resources of clean executable files;
determine a degree of similarity between the one or more resource of the executable file and the plurality of known resources of clean executable files; and
determine whether the executable file is malicious based on the determined degrees of similarity with known resources of clean executable files and the determined degrees of similarity with known resources of malicious executable files.

14. The system of claim 8, wherein the processor is further configured to, when the executable file is determined to be malicious, perform an antivirus check on the executable file, wherein the antivirus check includes one of signature analysis, heuristic analysis, hash sum analysis and behavioural analysis.

15. A computer program product stored on a non-transitory computer-readable storage medium, the computer program product comprising computer-executable instructions for detection of malicious executable files, including instructions for:
determining a type of an executable file;
determining types of extractable resources of the executable file based on the type of the executable file;
extracting the identified extractable resources of the executable file;
comparing the extracted resources of the executable file to a plurality of known resources of malicious executable files, each resource being defined with a plurality of attributes and each attribute being associated with a parameter;
determining a degree of similarity between one or more compared resource of the executable file and the plurality of known resources of malicious executable files based at least on parameters of the plurality of attributes of resources; and
determining whether the executable file is malicious based on a degree of similarity of the one or more compared resources, wherein different thresholds of the degrees of similarity are used in determining the maliciousness of different types of resources.

16. The product of claim 15, wherein instruction for determining a degree of similarity between one or more compared resource of the executable file and the plurality of known resources of malicious executable files further include instruction for adding up respective degrees of similarity for the plurality of compared resource.

17. The product of claim 15, wherein instruction for comparing the extracted resources of the executable file to a plurality of known resources of malicious executable files further include instruction for using a plurality of different comparison algorithms for different types of extracted resources.

18. The product of claim 15, wherein the executable file is considered malicious when the degree of similarity of at least one of the compared resources of the executable file to the known resources of a malicious executable file exceeds a given threshold; and
wherein the executable file is considered not malicious when the degree of similarity of at least one of the compared resources of the executable file to the known resources of a malicious executable file does not exceed a given threshold.

19. The product of claim 15, further comprising instructions for:
comparing the extracted resources of the executable file to a plurality of known resources of clean executable files;
determining a degree of similarity between the one or more resource of the executable file and the plurality of known resources of clean executable files; and
determining whether the executable file is malicious based on the determined degrees of similarity with known resources of clean executable files and the determined degrees of similarity with known resources of malicious executable files.

20. The product of claim 15, further comprising instructions for, when the executable file is determined to be malicious, performing an antivirus check on the executable file, wherein the antivirus check includes one of signature analysis, heuristic analysis, hash sum analysis and behavioural analysis.

* * * * *